(12) United States Patent
Kota et al.

(10) Patent No.: US 7,648,120 B1
(45) Date of Patent: Jan. 19, 2010

(54) COMPLIANT IRIS FLOW CONTROL SYSTEM

(76) Inventors: Sridhar Kota, 2256 Gray Fox Ct., Ann Arbor, MI (US) 48103; Zachary Kreiner, 331 Serenity Ct. SE., Albuquerque, NM (US) 87123; Yong Mo-Moon, 2709 Wheatman Ct., Pleasanton, CA (US) 94588

( * ) Notice: Subject to any disclaimer, the term of this patent is extended or adjusted under 35 U.S.C. 154(b) by 143 days.

(21) Appl. No.: 11/899,617

(22) Filed: Sep. 5, 2007

Related U.S. Application Data

(60) Provisional application No. 60/842,711, filed on Sep. 5, 2006.

(51) Int. Cl.
*F16K 3/03* (2006.01)

(52) U.S. Cl. .................. 251/212; 251/229; 251/342; 251/902

(58) Field of Classification Search ................ 251/212, 251/229, 340, 341–347, 901, 902; 138/45, 138/46
See application file for complete search history.

(56) References Cited

U.S. PATENT DOCUMENTS

| | | | | |
|---|---|---|---|---|
| 2,434,835 A * | 1/1948 | Colley | ........................ | 138/45 |
| 3,383,131 A * | 5/1968 | Rosfelder | ...................... | 251/4 |
| 3,695,576 A * | 10/1972 | Kane et al. | ..................... | 251/5 |
| 4,092,010 A * | 5/1978 | Carlson, Jr. | .................. | 251/212 |
| 4,094,492 A * | 6/1978 | Beeman et al. | ................ | 138/45 |
| 4,322,054 A * | 3/1982 | Campbell | ....................... | 251/7 |
| 4,412,669 A * | 11/1983 | Hanyu et al. | ................. | 251/212 |
| 4,705,518 A * | 11/1987 | Baker et al. | .................. | 128/899 |
| 5,112,324 A * | 5/1992 | Wallace | ....................... | 604/349 |
| 5,441,231 A * | 8/1995 | Payne et al. | ...................... | 251/7 |
| 5,975,141 A * | 11/1999 | Higazy | ............................ | 138/46 |
| 6,095,492 A * | 8/2000 | Rubitschung | ................ | 251/212 |
| 6,375,155 B1* | 4/2002 | Janssens | ...................... | 251/212 |
| 6,666,237 B2* | 12/2003 | De Antoni Migliorati et al. | | 251/212 |
| 6,896,240 B2* | 5/2005 | Wijaya | ......................... | 251/212 |
| 7,021,604 B1* | 4/2006 | Werner et al. | ................ | 251/212 |

* cited by examiner

*Primary Examiner*—John Bastianelli
(74) *Attorney, Agent, or Firm*—Rohm & Monsanto, PLC

(57) ABSTRACT

An iris arrangement has first and second annular carrier elements annular elements coaxially arranged and circumferentially interlocked with one another so as to be independently rotatable. A plurality of iris elements each have a first compliant beam element coupled at a first end thereof to the iris element and at a second end thereof to the first annular carrier element, and a second compliant beam element coupled at a first end thereof to the associated iris element and at a second end thereof to the second annular carrier element. Rotatory motion of the carrier elements relative to each other results in substantially radial displacement of each of the iris elements. The plurality of iris elements communicate with one another when disposed in a radially innermost position. A web covers a region between the plurality of iris elements and the circumference of the first and second annular elements.

17 Claims, 3 Drawing Sheets

COMPLIANT IRIS FLOW CONTROL SYSTEM

This application claims the benefit of the filing date of U.S. Provisional Patent Application Ser. No. 60/842,711 filed Sep. 5, 2006 in the names of the same inventors as herein. The disclosure of that provisional patent application is incorporated herein by reference.

BACKGROUND OF THE INVENTION

1. Field of the Invention

This invention relates generally to metering arrangements and systems, and more particularly, to a system for controlling the propagation of light and the flow of fluids.

2. Description of the Related Art

In many design applications, controlling the amount of light or fluid transmitted through a variable aperture or an orifice is an important design objective. Some of these applications include camera shutter systems, HVAC air flow control valves, jet fuel flow control valves, exhaust valves, and artificial replacement heart valves. Flow control in these situations is frequently accomplished by a mechanical valve, such as a ball valve or a butterfly valve, that does not allow central flow throughout its range of operation and creates large pressure drops.

Conventional camera iris designs use rigid-link mechanisms to achieve aperture control. These mechanisms are complicated and often are difficult to implement because they are used in situations with constraints that limit their size. Compliant mechanisms can often replace complicated rigid-link mechanisms in such situations because they function very well at such small scales. Also, compliant mechanisms have other desirable properties for an iris such as the elimination of joint friction, wear, and backlash, all of which make them far more precise than conventional mechanisms. Therefore, a new iris that utilizes all the advantages of compliant mechanisms is desired to replace the conventional iris.

It is, therefore, an object of this invention to provide an iris arrangement for controlling the propagation of light.

It is another object of this invention to provide an iris arrangement for controlling the flow of air in a HVAC system.

It is still another object of the invention to provide an iris arrangement that provide central flow of fluid and thereby controls the flow rate.

It is also an object of this invention to provide an iris arrangement for controlling the flow of fuel to a jet engine.

It is a further object of this invention to provide an iris arrangement for controlling the flow of exhaust from an internal combustion engine.

It is additionally an object of this invention to provide an iris arrangement for controlling the flow of blood in an artificial heart valve system.

It is yet a further object of this invention to provide an iris arrangement that is compact.

It is also another object of this invention to provide an iris arrangement that exhibits reduced friction and wear.

SUMMARY OF THE INVENTION

The foregoing and other objects are achieved by this invention which provides an arrangement for causing substantially linear displacement of an element of interest. In accordance with the invention, there are provided first and second carrier elements. A first compliant beam element is coupled at a first end thereof to the element of interest and at a second end thereof to the first carrier element. Additionally, a second compliant beam element coupled at a first end thereof to the element of interest and at a second end thereof to the second carrier element. Motion of the first carrier element relative to the second carrier element results in the substantially linear displacement of the element of interest.

In one embodiment of the invention, the first and second compliant beam elements are each formed of a resilient polymeric material. In other embodiments, the first and second compliant beam elements are each formed of a resilient metal, such as a spring material.

Preferably, the first and second carrier elements constitute respective first and second ring carrier elements, the first and second ring carrier elements being arranged in coaxial relation with respect to each other. The first and second ring carrier elements are axially interlocked with each other and configured to be independently rotatable with respect to each other. Thus, rotation of the first and second ring carrier elements in opposing rotatory directions in relation to one another results in resilient bending of the first and second compliant beam elements, whereby the element of interest is urged to substantially linear displacement. The substantially linear displacement is in a direction that is substantially radial with respect to the first and second ring carrier elements.

In a further embodiment, there is provided a second element of interest, and there are additionally provided a further first compliant beam element coupled at a first end thereof to the second element of interest and at a second end thereof to the first carrier element, and a further second compliant beam element coupled at a first end thereof to the second element of interest and at a second end thereof to the second carrier element. Motion of the first carrier element relative to the second carrier element results in the substantially linear displacement of the second element of interest. In this further embodiment, the substantially linear displacement of element of interest and substantially linear displacement of the second element of interest are along respective ones of first and second paths.

In embodiments of the invention where the first and second carrier elements are respective first and second ring carrier elements, the first and second ring carrier elements are arranged in coaxial relation with respect to each other, and the respective ones of first and second paths are disposed along respective radii of the first and second ring carrier elements. A web element is arranged in certain embodiments to cover a region between the elements of interest and a circumference of the coaxial ring elements, and thereby preclude flow of light or fluid, as the case may be, through the region radially outward of the elements of interest.

In accordance with a further apparatus aspect of the invention, there is provided an arrangement for opening and closing an aperture. The arrangement is provided with first and second carrier elements. Additionally, there is provided a plurality of iris elements, each of the iris elements having associated therewith a first compliant beam element coupled at a first end thereof to the associated iris element and at a second end thereof to the first carrier element, and a second compliant beam element coupled at a first end thereof to the associated iris element and at a second end thereof to the second carrier element. Motion of the first carrier element relative to the second carrier element results in the substantially linear displacement of each of the iris elements along respective paths.

In one embodiment of this further apparatus aspect of the invention, the first and second carrier elements constitute respective first and second ring carrier elements. The first and second ring carrier elements are arranged in coaxial relation with respect to each other. Additionally, the respective paths of the substantially linear displacement of each of the iris elements are disposed along respective radii of the first and second ring carrier elements. Preferably, the respective first and second ring carrier elements are coaxially interlocked with one another and configured to be independently rotatable with respect to each other. Also, the motion of the first and second ring carrier elements relative to one another constitutes counter rotatory motion.

The plurality of iris elements in one embodiment are disposed within a circumference of the first and second ring carrier elements. There is further provided a web element for covering a region between the iris elements and the circumference of the first and second ring carrier elements.

In accordance with a still further apparatus aspect of the invention, there is provided an iris arrangement having a first annular carrier element and a second annular carrier element. The first and second annular elements are coaxially arranged and circumferentially interlocked with one another so as to be independently rotatable with respect to each other. A plurality of iris elements are also provided, each of the iris elements having associated therewith a first compliant beam element coupled at a first end thereof to the associated iris element and at a second end thereof to the first annular carrier element, and a second compliant beam element coupled at a first end thereof to the associated iris element and at a second end thereof to the second annular carrier element. The plurality of iris elements are disposed radially inward of a circumference of the first and second annular elements. Rotatory motion of the first annular carrier element relative to the second annular carrier element results in substantially radial displacement of each of the iris elements.

In one embodiment of this still further apparatus aspect of the invention, there is further provided a cover arrangement for covering a region between the plurality of iris elements and the circumference of the first and second annular elements. In a further embodiment, the plurality of iris elements are configured to communicate with one another when disposed in a radially innermost position.

Applications for the apparatus of the present invention include variable orifice flow control in a variable geometry conduit for internal flow. By employing multiple compliant iris mechanisms along the flow path in tandem and differentially controlling their individual openings a variable geometry flow path can be established to operate a pump efficiently under different loading conditions. Another application of the compliant iris is in the design of a lapdisc for surgical procedures which allows the surgical instruments of different diameters and cross-sections to pass with minimal effort but restrict the flow of other fluids in the opposite direction.

The Compliant Iris mechanism can be used to control the gap (clearance) between a shroud (iris embedded inside the shroud) and a rotating member (blades) to control the fluid flow or leakage between the blades and the shroud. The mechanism can also be used to serve the function of a torsional spring. A desired nonlinear torque-angle relationship can be obtained by sizing the various elements of the iris mechanism appropriately. The mechanism can be made out of a variety of materials depending on application including spring steel, titanium, and composites. There are only two discrete members in the mechanism which are bonded near the central section. Each member can be a metal stamping. Casting, molding and machining are other means to fabricate the device. The iris mechanism can also be used to grasp circular cross section objects of different sizes such as coffee cups or soft-drink cups and may be used as cup-holders in automobiles. Finally, the iris can also be used as a children's toy.

BRIEF DESCRIPTION OF THE DRAWING

Comprehension of the invention is facilitated by reading the following detailed description, in conjunction with the annexed drawing, in which.

DETAILED DESCRIPTION

Figure 1:
FIG. 1 is a perspective representation of a specific illustrative embodiment of the compliant iris system of the present invention, in a neutral position.
Figure 1:
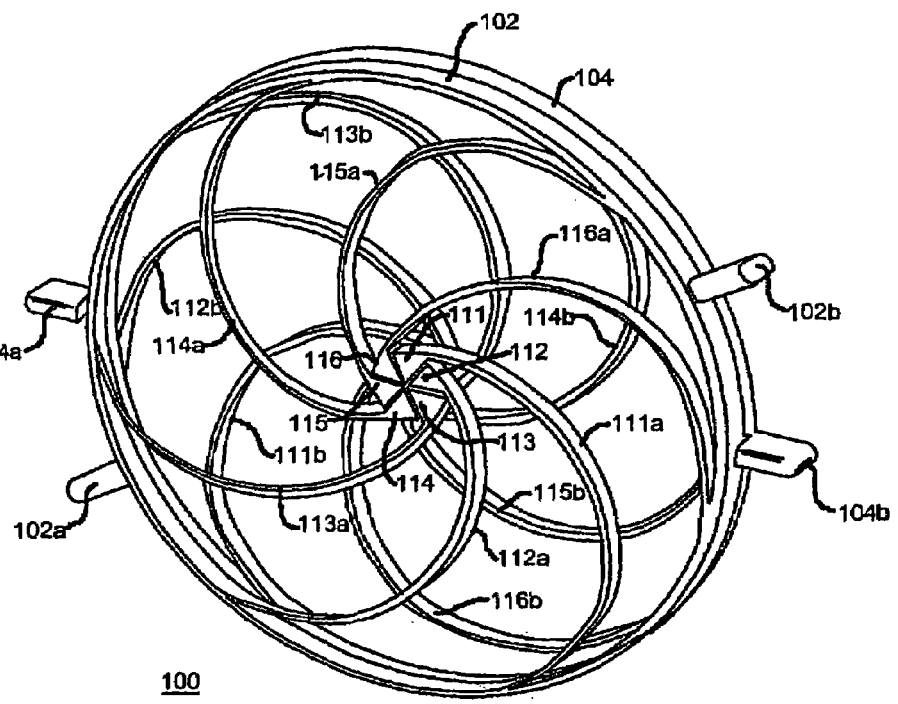
Figure 2:
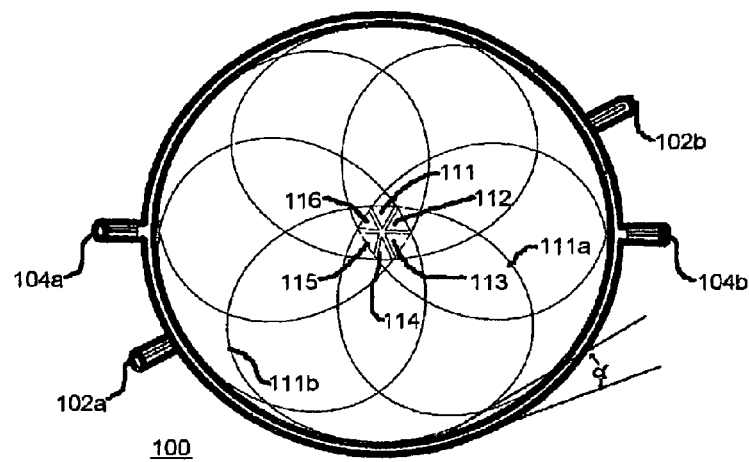
FIG. 2 is a plan representation of the specific illustrative embodiment of FIG. 1, in a neutral position.

FIG. 1 is a perspective representation of a specific illustrative embodiment of a compliant iris system 100 of the present invention, in a neutral position. FIG. 2 is a plan representation of compliant iris system 100 in a neutral position. In this specific illustrative embodiment of the invention, the neutral position will be described as the position with the iris closed. In other embodiments, the neutral position may be the fully open, or a partially open, position. As shown in these figures, there are provided a first carrier element 102 and a second carrier element 104. In this specific illustrative embodiment of the invention, there are provided six elements of interest identified as 111 to 116 in the figure. Each of the six elements of interest 111 to 116 has an associated one of first compliant beam elements 111a to 116a that is coupled at a first end thereof to the associated element of interest and at a second end thereof to first carrier element 102. Additionally, each element of interest has an associated one of second compliant beam elements 111b to 116b coupled at a first end thereof to the associated element of interest and at a second end thereof to second carrier element 104. Rotatory motion of first carrier element 102 relative to second carrier element 104 results in substantially linear displacement (i.e., translation along a radial direction) of the elements of interest, as will be described below.

In this specific illustrative embodiment of the invention, carrier elements 102 and 104 are provided with tabs 102a, 102b, and 104a, 104b, respectively. These tabs facilitate manipulation of the rings in this prototypical embodiment, as will be described below. Of course, other carrier drive arrangements can be employed in the practice of the invention. For instance, the relative motion between the tabs can be accomplished through use of a Shape Memory Wire connecting the two tabs or by engaging a drive gear with gear teeth cut into the outer rings (i.e., carrier elements).

Figure 3:
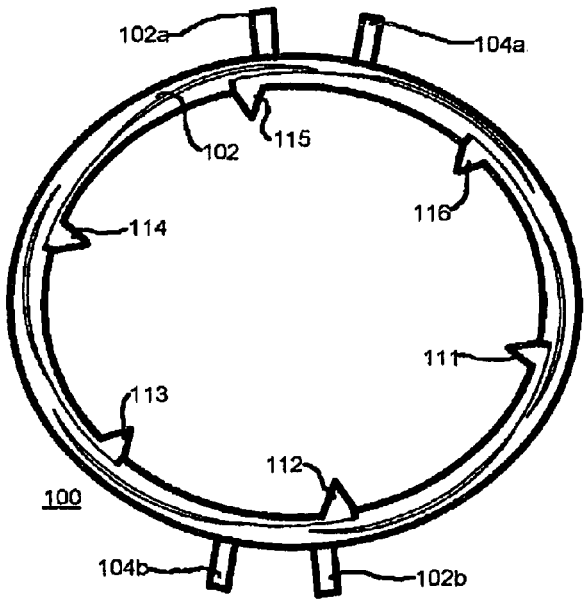
FIG. 3 is a plan representation of the specific illustrative embodiment of FIG. 1, in an open position.

FIG. 3 is a plan representation of compliant iris system 100 in an open position. Elements of structure that have previously been discussed are similarly designated in this figure. In order to achieve the open position in this embodiment, 102a and 104a, and 102b and 104b, are manipulated to be brought circumferentially closer to each another, whereby carrier elements 102 and 104 are counter rotated.

Figure 4:
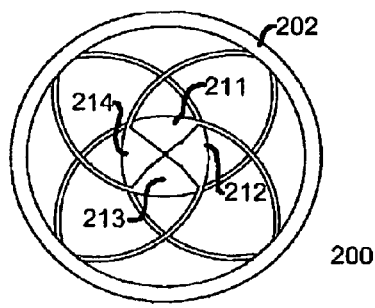
FIG. 4 is a plan representation of the specific illustrative embodiment in a neutral position.
Figure 5:
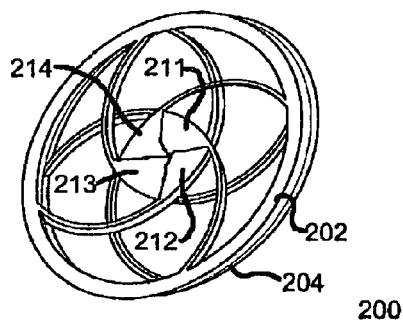
FIG. 5 is a plan representation of the specific illustrative embodiment of FIG. 6, in a neutral position.
Figure 6:
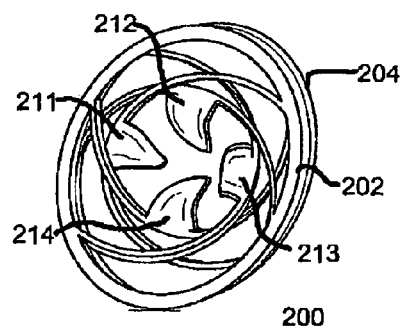
FIG. 6 is a plan representation of the specific illustrative embodiment of FIG. 6, in an open position.

FIG. 4 is a plan representation of a specific illustrative embodiment of a compliant iris system 200 in a neutral position. FIG. 5 is a plan representation of compliant iris system 200 in a neutral position. FIG. 6 is a plan representation of compliant iris system 200 in an open position. Elements of structure are similarly designated in these figures. Compliant iris system 200 has four elements of interest 211 to 214. In this embodiment, the elements of interest are configured to facilitate fluid flow. Rotatory motion of first carrier element 202 relative to second carrier element 204 results in substantially linear displacement of the elements of interest.

The embodiment of FIGS. 4 to 6 is useful as a valve, and as shown, employs only four blades (elements of interest), rather than six, as is the case in the embodiment of FIGS. 1 to 3. Also, the blades in this embodiment have a neutral position that is between the fully open and closed positions. This allows the hyperbolic tapers (as shown) of the elements of interest so as to allow passive actuation of the iris arrangement due to pressure difference across the iris valve. Alternatively, the motion of the hyperbolic tapers can be effectuated by an external drive means (not shown) that creates relative motion between the tabs.

The iris arrangement described herein can be applied to control flow (not shown) as a mechanism in which all sides of the iris aperture (not specifically designated) close or open concurrently. While standard rigid-link mechanisms that accomplish this are very complicated, the compliant iris of the present invention consists of just two rings (carrier elements). Each ring has thin beams (compliant beam elements) that extend into the center of the ring as shown in FIG. 1. The rings are disposed in stacked relation upon one another (in the direction perpendicular to the plane of the figure), and the beams are joined at the ends. Then, when one ring is rotated against the other, beam deflection occurs. This deflection is used to open or close an aperture in the center of the ring.

Design Objectives

The creation of a viable compliant iris requires that two design objectives be met. First, the iris aperture should be actuatable from fully closed to fully open with only minimal force and rotational displacement. Achieving this objective will ensure that the iris will have other desired characteristics, such as ease of operation and minimum deflection of the internal beams. These considerations in turn will increase the life cycle of the iris. Second, since the iris arrangement of the present invention is useful in many different applications, the final design should be easily modifiable. As a camera shutter, it will be fully closed in its neutral position, but for other mechanisms such as a fluid-flow valve it may need to have a neutral position that is halfway between fully opened and fully closed, or a neutral position that is fully open.

The prototypical design of FIGS. 1 to 3 functions from fully closed to fully open with a necessary force on the tabs of only 2.0±0.5 N. While this is not the lowest force of all possible topologies, the diameter of the aperture when fully open compensates for this. The terminals of the beams have been designed so that when in the fully open position (see, FIG. 3), only the wedges at the ends of the compliant beam elements extend into the center of the iris. This results in a maximum aperture size, for this specific illustrative embodiment of the invention, of 6.4±0.1 cm from the tip of one wedge to the other and total iris diameter of 8 cm. Without the wedges, the same diameter iris can reach a maximum aperture size of 7.1±0.1 cm. Also, the angle of the iris beams at their origin has been designed so that the deflection of the iris blades is spread out over the entire beam, rather than being focused at the origin. This will increase the life of the iris by lowering stress concentrations. The topology is a circle within a circle, and easily can be modified to achieve a design that is adapted for applications having different neutral positions or numbers of blades (compliant beam elements).

The design should be optimized to reduce the force necessary for actuation, and to ensure that there preferably are no stress concentrations. These factors will allow the iris arrangement to be easy to operate and to ensure a long life cycle. Also, a web (not shown) must be placed over the compliant beam elements of the iris for blocking fluid flow.

The design of the compliant iris can be extended in three ways. First, a method for optimizing the topology is determined. Rather than simply to optimize this single design, the topology can be modified for many different applications, and changing the size, neutral position, and number of blades of the topology can change the particular optimal configuration.

Second, a web configuration is provided to cover up the areas between the beams of the iris. Any application implementing the iris as a fluid flow control device will require the fluid be blocked in the fully closed position. To accomplish this, a membrane will cover the gaps between the beams. The membrane should be flexible and able to undergo large amounts of deformation, but must also be sufficiently strong to resist the fluid flow that the iris is impeding. In some embodiments, for example, a substantially frusto-conical membrane can axially be arranged in relation to the iris, the apex of the substantially frusto-conical membrane being coupled to the radially displaceable elements of the iris. This axial arrangement will reduce the extent of deformation required of the membrane material. In other embodiments, such as where blockage of light is desired, a plurality of concentrically pleated arcuate segments can be employed, each segment having a substantially arcuate configuration and arranged to overlap its neighboring segments to close the areas between the beams. Each arcuate segment is coupled at its apex region to a respectively associated one of the wedges at the ends of the compliant beam elements. Again, the pleats will reduce the extent of deformation required of the membrane material. Numerous other membrane arrangements can be configured in light of the teaching herein.

Topology Optimization

It is desired that the design of the present invention be optimized to operate with the lowest force and rotational displacement possible, as well as to give the iris an extremely long life cycle. There are three variables that are important in optimizing the topology of the inner circle iris. These include:
 (I) The angular orientation of the compliant beam elements with respect to the elements of interest;
 (ii) The curvature of the compliant beam elements, which in some embodiments of the invention are circular to conform with the curvature of the carrier elements during actuation; and
 (iii) The angular orientation where the compliant beam elements meet the carrier elements. In the embodiments discussed herein, the angle $\alpha$ (see, FIG. 2) should be minimized.

The angle that the compliant beam elements make with each other at their respective elements of interest is the principal factor in determining the extent to which the wedge-shaped elements of interest extend into the center of the iris when in the fully open position, in turn determining the maximum diameter of the iris aperture. If this angle is too large, the elements of interest will extend outward a great deal. However, if the angle is too low, the tips of the elements of interest will press into other elements of interest, causing them to deflect too much and causing stress concentrations. The correct angle can be determined empirically or by computer optimization, which would be more expedient.

Another design variable that will be important when optimizing the topology is the curvature between the origin and terminus of each of the compliant beam elements. The correct curvature insures that as the carrier elements are actuated they deflect evenly, lowering stress concentrations in the compliant beam elements by conforming easily to the carrier elements, as seen in FIG. 3. Another result of having the correct curvature is that, along with the angle the compliant beam elements make with each other at their termini, it reduces the size of the gaps between the elements of interest of the iris and the compliant beam elements.

One of the most important variables to optimize is the angle between the compliant beam elements and the carrier elements at the beam origins as seen in FIG. 2. This variable determines the amount of the stress concentration at the origins of the compliant beam elements. Stress concentration at these points could be removed if the angle between the carrier elements and the compliant beam elements is reduced. This way, as the iris is actuated, the compliant beam elements will deflect and communicate with the carrier elements. As the carrier elements are actuated further, more and more of the compliant beam elements will press up against the carrier elements, spreading the deflection over the entire compliant beam element. Optimization of this variable ensures that deflection does not occur exclusively at the origin of the respective compliant beam element.

Other Variables

Optimization of the thickness of the compliant beam elements over their entire length can ensure that during actuation the compliant beam elements deflect with minimal stress increase. A standard 0.8 mm that was used for nearly all the prototypical models. This dimension works well, and was chosen due to limitations in the fabrication of prototype models. The optimal thickness can, in other embodiments, be varied over the length of the compliant beam element.

Another variable to be considered is the depth of the compliant beam elements. This value will determine the out of plane stiffness of the overall iris arrangement. The necessary stiffness will vary according to the size of the iris, as well as whether it is impeding light propagation or fluid flow.

External resisting forces should be considered in optimizing the cross-section of the compliant beam elements. The out of plane thickness plays a significant role (thickness cubed) in providing bending stiffness (or compliance). The slope (angle between the beam and the carrier element) should be as close to zero as possible to reduce the maximum bending stresses.

Variables for topology optimization are different from the variables for size/geometry optimization. Input force/displacement and external forces (that are resisting intended motion) should also be considered. In addition, consideration is to be given to the number of compliant beam elements and their interconnections, the beam cross section, and the slope and curvature.

Creation of an Iris Membrane

Once the topology has been optimized, a web (not shown), in certain embodiments, is to be placed over the compliant beam elements so that the resulting iris can impede fluid flow. The web is flexible and elastic so as to accommodate the compliant beam elements, which deflect greatly during actuation. This deflection occurs both tangentially and radially to the iris carrier elements. In embodies where the web is attached in such a way that it only experiences deformation in one direction, it could be made to fold, rather than to stretch or compress.

Although the invention has been described in terms of specific embodiments and applications, persons skilled in the art can, in light of this teaching, generate additional embodiments without exceeding the scope or departing from the spirit of the invention described and claimed herein. Accordingly, it is to be understood that the drawing and description in this disclosure are proffered to facilitate comprehension of the invention, and should not be construed to limit the scope thereof.

What is claimed is:

1. A arrangement for causing substantially linear displacement of an element of interest, the arrangement comprising:
    a first carrier element;
    a second carrier element;
    a first compliant beam element coupled at a first end thereof to the element of interest and at a second end thereof to said first carrier element; and
    a second compliant beam element coupled at a first end thereof to the element of interest and at a second end thereof to said second carrier element;
    whereby motion of said first carrier element relative to said second carrier element results in the substantially linear displacement of the element of interest
    wherein said first and second carrier elements comprise respective first and second ring carrier elements, said first and second ring carrier elements being arranged in coaxial relation with respect to each other;
    wherein there is further provided a second element of interest, and there are additionally provided:
    a further first compliant beam element coupled at a first end thereof to the second element of interest and at a second end thereof to said first carrier element; and
    a further second compliant beam element coupled at a first end thereof to the second element of interest and at a second end thereof to said second carrier element;
    whereby motion of said first carrier element relative to said second carrier element results in the substantially linear displacement of the second element of interest.

2. The arrangement of claim 1, wherein said first and second compliant beam elements are each formed of a resilient polymeric material.

3. The arrangement of claim 1, wherein said first and second compliant beam elements are each formed of a resilient metal.

4. The arrangement of claim 1, wherein said first and second ring carrier elements are axially interlocked with each other and configured to be independently rotatable with respect to each other.

5. The arrangement of claim 1, wherein rotation of said first and second ring carrier elements in opposing rotatory directions in relation to one another results in resilient bending of said first and second compliant beam elements, whereby the element of interest is urged to substantially linear displacement.

6. The arrangement of claim 5, wherein said substantially linear displacement is in a direction that is substantially radial with respect to said first and second ring carrier elements.

7. The arrangement of claim 1, wherein the substantially linear displacement of element of interest and substantially linear displacement of the second element of interest are along respective ones of first and second paths.

8. The arrangement of claim 7, wherein said first and second carrier elements comprise respective first and second ring carrier elements, said first and second ring carrier elements being arranged in coaxial relation with respect to each other, and the respective ones of first and second paths are disposed along respective radii of said first and second ring carrier elements.

9. The arrangement of claim 8, wherein there is further provided a web element arranged to cover a region between the elements of interest and a circumference of said coaxial ring elements.

10. A arrangement for opening and closing an aperture, the arrangement comprising:
   a first carrier element;
   a second carrier element;
   a plurality of iris elements, each of said iris elements having associated therewith;
      a first compliant beam element coupled at a first end thereof to the associated iris element and at a second end thereof to said first carrier element; and
      a second compliant beam element coupled at a first end thereof to the associated iris element and at a second end thereof to said second carrier element;
   whereby motion of said first carrier element relative to said second carrier element results in the substantially linear displacement of each of said iris elements along respective paths wherein said first and second carrier elements comprise respective first and second ring carrier elements, said first and second ring carrier elements being arranged in coaxial relation with respect to each other, said respective paths of the substantially linear displacement of each of said iris elements being disposed along respective radii of said first and second ring carrier elements.

11. The arrangement of claim 10, wherein said respective first and second ring carrier elements are coaxially interlocked with one another and configured to be independently rotatable with respect to each other.

12. The arrangement of claim 10, wherein the motion of said first and second ring carrier elements relative to one another constitutes counter rotatory motion.

13. The arrangement of claim 12, wherein said plurality of iris elements are disposed within a circumference of said first and second ring carrier elements.

14. The arrangement of claim 13, wherein there is further provided a web element for covering a region between said iris elements and the circumference of said first and second ring carrier elements.

15. An iris arrangement comprising:
   a first annular carrier element;
   a second annular carrier element, said first and second annular elements being coaxially arranged and circumferentially interlocked with one another so as to be independently rotatable with respect to each other;
   a plurality of iris elements, each of said iris elements having associated therewith;
      a first compliant beam element coupled at a first end thereof to the associated iris element and at a second end thereof to said first annular carrier element; and
      a second compliant beam element coupled at a first end thereof to the associated iris element and at a second end thereof to said second annular carrier element;
   wherein said plurality of iris elements are disposed radially inward of a circumference of said first and second annular elements, and rotatory motion of said first annular carrier element relative to said second annular carrier element results in substantially radial displacement of each of said iris elements.

16. The iris arrangement of claim 15, wherein there is further provided a cover arrangement for covering a region between said plurality of iris elements and the circumference of said first and second annular elements.

17. The iris arrangement of claim 15, wherein said plurality of iris elements are configured to communicate with one another when disposed in a radially innermost position.

* * * * *